United States Patent [19]

Snell

[11] Patent Number: 5,385,219

[45] Date of Patent: Jan. 31, 1995

[54] VIBRATION ABSORBING STRUCTURES FOR HEAVY CONSTRUCTION PURPOSES

[75] Inventor: Michael B. Snell, Bournemouth, Great Britain

[73] Assignee: The Secretary of State for Defence in Her Britannic Majesty's Government of the United Kingdom and Northern Ireland, United Kingdom

[21] Appl. No.: 137,047

[22] PCT Filed: Sep. 10, 1991

[86] PCT No.: PCT/GB91/01541

§ 371 Date: Oct. 19, 1993

§ 102(e) Date: Oct. 19, 1993

[87] PCT Pub. No.: WO93/05314

PCT Pub. Date: Mar. 18, 1993

[30] Foreign Application Priority Data

Apr. 25, 1990 [GB] United Kingdom ............... 9009320
May 13, 1991 [GB] United Kingdom ............... 9110287

[51] Int. Cl.$^6$ .................... F16F 7/10; E01D 15/12
[52] U.S. Cl. .................... 188/378; 267/136; 14/2.5
[58] Field of Search ........... 188/378, 379, 380, 299, 188/311, 312, 314, 317, 318; 267/136, 113, 137; 14/2.5, 77.1

[56] References Cited

U.S. PATENT DOCUMENTS

| | | | |
|---|---|---|---|
| 3,490,605 | 1/1970 | Ross | 14/77.1 X |
| 4,470,121 | 9/1984 | Ebert | 188/378 X |
| 4,924,976 | 5/1990 | Bernett | 188/378 |
| 4,972,538 | 11/1990 | Parramore | 14/2.5 |

FOREIGN PATENT DOCUMENTS

| | | |
|---|---|---|
| 0168725 | 1/1986 | European Pat. Off. . |
| 0192859 | 9/1986 | European Pat. Off. . |
| 1387279 | 12/1964 | France . |
| 2577863 | 8/1986 | France . |
| 9001776 | 8/1990 | Germany . |
| 2013281 | 8/1979 | United Kingdom . |
| 2196674 | 5/1988 | United Kingdom . |
| 2243388 | 10/1991 | United Kingdom . |

Primary Examiner—Douglas C. Butler
Assistant Examiner—Peter M. Poon
Attorney, Agent, or Firm—Nixon & Vanderhye

[57] ABSTRACT

In a heavy structure e.g. a bridge which includes an element liable to low frequency vibration during erection, i.e. when the structure is unstable, another element which is an integral structure part after erection is used as the mass of a dynamic absorber for damping this vibration. In the example given, a launch rail (46) for erecting a bridge across a river is cantilevered out over the river, after which a support leg (50) is extended by means of an integral jack to engage the ground and form a stable structure. The support leg includes a lower part (54) which is suspended during erection from the upper part of the leg through a gas spring, with the gas spring and the mass of the lower part together constituting a dynamic absorber for the lauch rail during erection. After erection, structural loads are transmitted directly to the lower leg part via a trunnion. The gas spring includes an air reservoir, the effective volume of which is preferably adapted to be tuned, at least approximately, to the mass being damped.

16 Claims, 3 Drawing Sheets

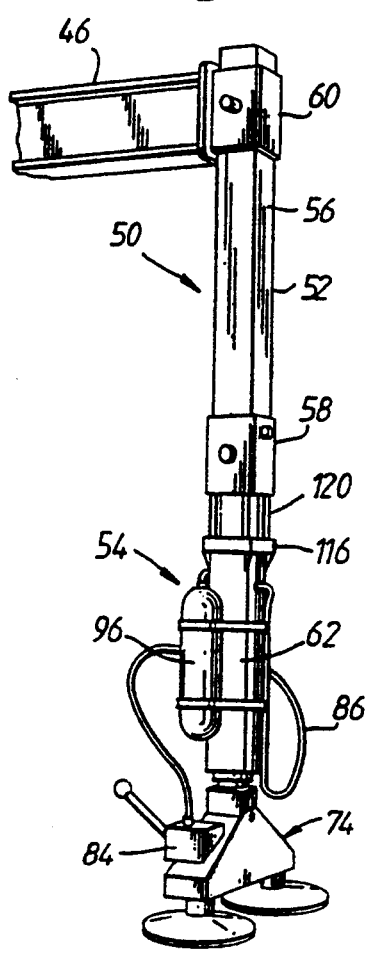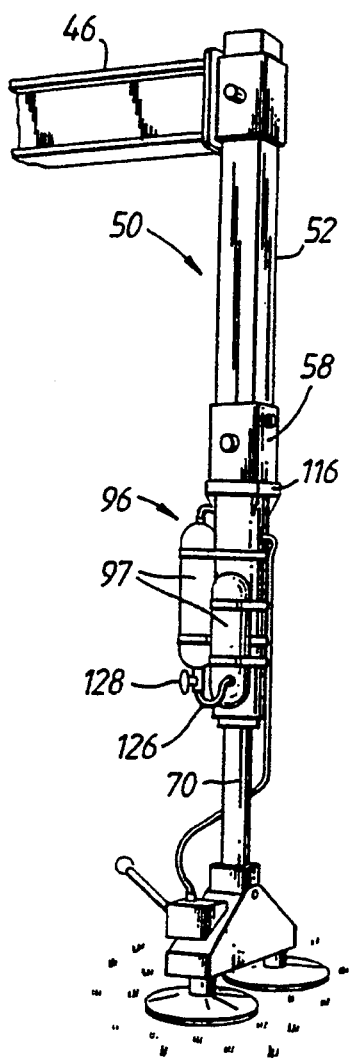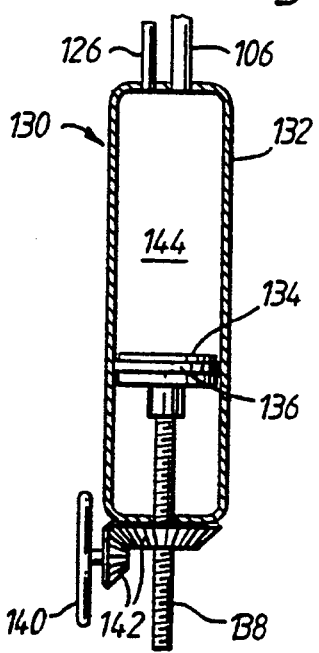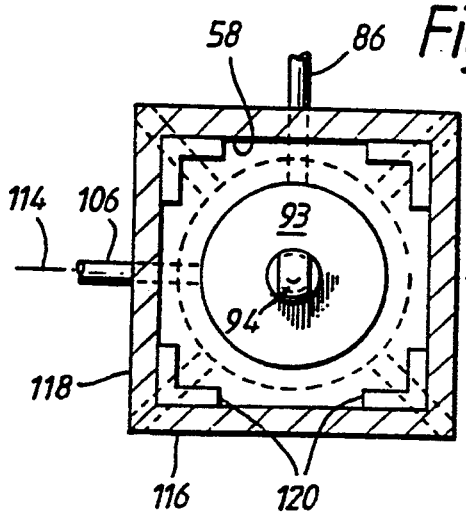

VIBRATION ABSORBING STRUCTURES FOR HEAVY CONSTRUCTION PURPOSES

This invention relates to structures for heavy construction purposes, adapted to function when in a stable erected state and including a first structural element and a second structural element juxtaposed to each other and adapted for direct transfer of structural loads between them when the structure is in the erected state.

The term "structure", as used herein and as qualified above, is to be taken to mean a structure which, when not in a stable erected state, is in a structurally deficient state, that is to say a state in which it is neither statically determinate nor redundant. Such a state is sometimes referred to as "unstable".

Such structures may take many different forms, notably that of a frame type construction, for example a frame of a building, a support frame for heavy chemical plant, a bridge, and so on. As used herein, the term "structure for heavy construction purposes" embraces any structure which is itself "heavy" and which is either the object of construction itself (for example a bridge or a building frame), or is a structure used during construction of something else. Examples of this latter type of structure include cranes, tunnelling equipment, certain types of earth moving and excavation equipment, launching rails for temporary bridges, etc. Structures of this type may indeed be used for purposes which are not strictly "construction", and an example of these might be a walking dragline or similar used in opencast mining.

"Heavy construction Purposes" is therefore to be construed in a correspondingly broad way. In general, the invention is concerned with what happens when the structure in question is not in its stable erected state but is itself structurally deficient, for example (and especially) while it is being erected. In particular, the invention is concerned with the damping of forced vibrations, especially (though not necessarily) those which arise when one member of the structure is cantilevered or otherwise liable to undergo vibration in its natural flexural mode. Thus, in the above definition, the first element of the structure may, during the course of erection, undergo very low frequency flexural vibration which, in the case of a long and heavy member, can under some circumstances make it at least dangerous and sometimes unmanageable. This may occur as a result of applied forces, e.g. due to the action of wind, or may occur naturally as a result of vortex shedding when the member is being moved through the atmosphere.

The use of what will be called a dynamic absorber for damping vibrations in a body has been known per se for a long time. A dynamic absorber, as proposed up to the present time, consists essentially of a mass which is provided especially for the purpose and which is attached to the body to be damped by means of a spring or other resilient element. The stiffness of the latter, and the magnitude of the mass, are so chosen that when the body to be damped is subjected to influences such as to cause it to vibrate, these vibrations are absorbed by the dynamic absorber, which then itself undergoes oscillations. Depending on the extent to which the dynamic absorber is accurately tuned to the particular frequency or frequencies of the vibrations actually being damped, the amplitude of vibration of the main body is reduced by a greater or lesser amount, and may sometimes be eliminated altogether.

Practical applications of dynamic absorbers, sometimes called dynamic eradicators, dynamic balancers or inertia dampers, include a number of published proposals for use as part of vehicle suspension systems, or for use in preventing vibration occurring in scientific instruments. It has also been proposed to use a pendulum, attached by means of an elastic element to a civil engineering structure, for example a tall lattice tower, the pendulum having an appropriate mass and acting as an indicator that forces are acting on the structure such as to cause it to vibrate, while the absorber of which it is part reduces or eliminates that vibration.

According to the invention, in a structure for heavy construction purposes adapted to function when in a stable erected state and including a first structural element and a second structural element juxtaposed to, and of substantially smaller mass than, the first element, the first and second elements are adapted for direct transfer of structural loads between them in the erected state only, and the structure further includes a joint between the said elements whereby the second element is supported from only the first element when the structure is in a structurally deficient state, and the second element includes a resilient coupling, secured to the joint and being of such stiffness that, in the deficient state, the second element constitutes a dynamic absorber for damping forced vibrations of the first element.

There is thus no additional mass provided for the purpose of acting as the working mass of a dynamic absorber. A structural element of the structure itself is instead adapted to act as a dynamic absorber when needed, i.e. when the structure is in its "unstable" state, for example during erection.

The second element preferably has load bearing means for transferring substantially all structural loads between the two elements in the erected state, and the joint comprises suspension means whereby the second element is fully suspended from the first element in the deficient state. These load bearing means are effectively in parallel with the suspension joint, so that whereas in the structurally deficient state the second element is supported only from the first element via the joint, in the erected state (in which the second element will be engaged structurally with a third element, which may be another element of the structure, or typically the ground), the structural loads are taken directly through the load bearing means which bypass the suspension joint.

The resilient coupling preferably comprises a gas spring. In preferred embodiments, the second element comprises a body formed with a damping chamber, and a working element carried by the body and connected to the said joint, with this working element defining a boundary of the damping chamber and being arranged for relative displacement between itself and the body; and the second element includes a closed gas chamber, at least part of which consists of a portion of the damping chamber, the coupling comprising the working element and the gas chamber. When the latter contains an appropriate quantity of a gas, the coupling then acts as a gas spring.

In such an arrangement, the working element may for example be in the form of a diaphragm or bellows, or a piston which is part of a piston member sliding in a gas spring cylinder which constitutes the damping chamber.

The gas chamber preferably includes a gas reservoir external to the damping chamber, and conduit means for bringing the damping chamber into communication with the reservoir. The gas reservoir may consist of a single vessel; alternatively it may comprise a plurality of closed vessels, the conduit means being connected with each vessel and including means for selectively isolating at least one of the vessels from the damping chamber whereby the number of vessels acting as the gas reservoir can be varied. These vessels may be connected in series or in parallel.

The gas reservoir may consist of, or include, at least one closed vessel having adjusting means for varying to a predetermined value the effective volume of the vessel.

The invention will now be explained, and an embodiment described by way of example only, with reference to the accompanying drawings, in which:

FIG. 5 is a perspective view showing the outboard end of a launch rail of the kind shown in FIGS. 3 and 4, the launch rail structure being adapted in accordance with the invention and being shown in FIG. 5 in a structurally deficient state as defined above;

FIG. 6 is a view similar to FIG. 5 but shows the same part of the structure in its stable, erected state ready to be used in erecting a bridge (FIG. 6 also differs from FIG. 5 in showing a modified form of air reservoir);

Figure 7:
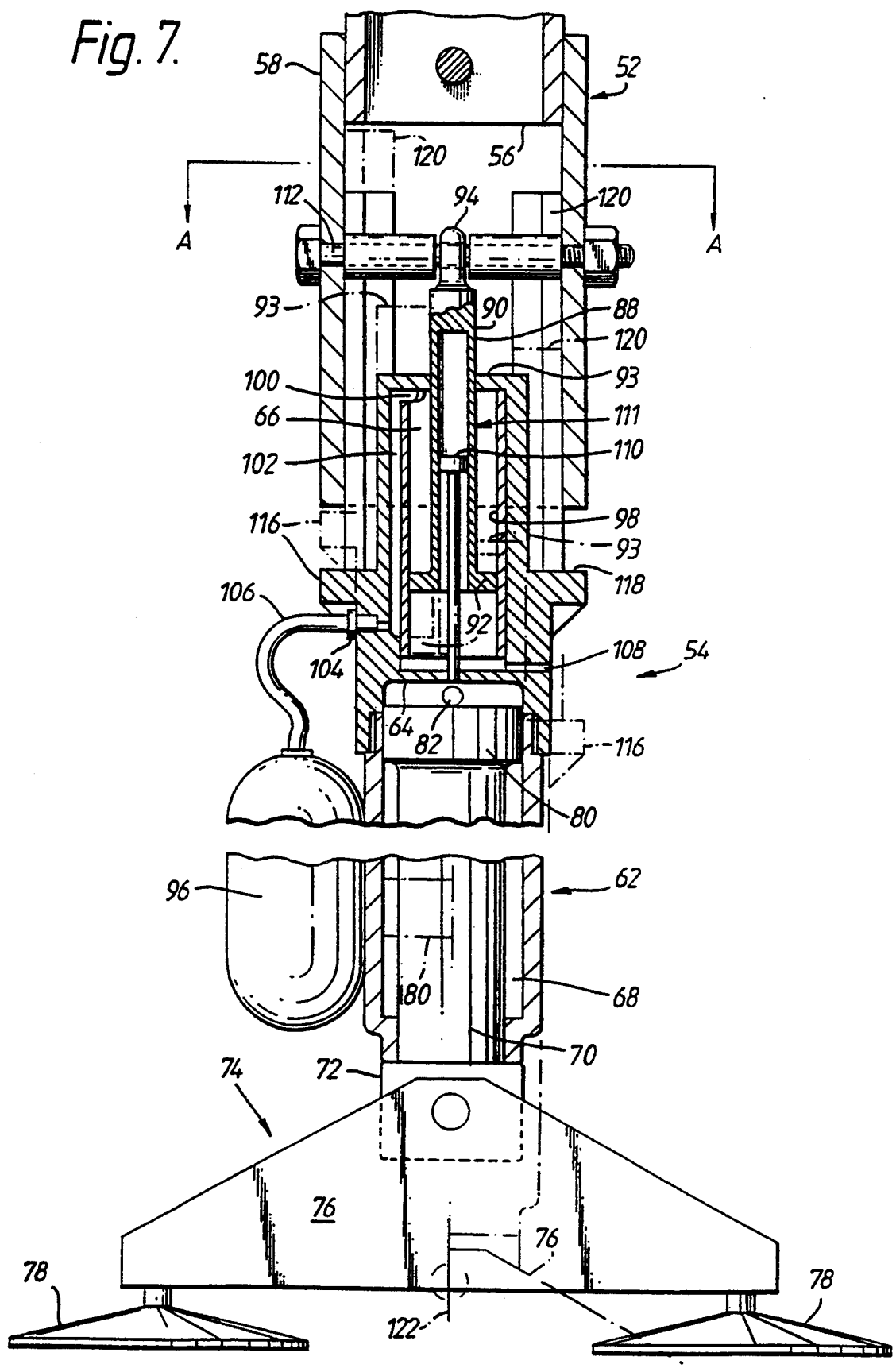

FIG. 7, on a much larger scale, is an elevation seen largely in vertical cross section, of the relevant parts of the leg, seen in FIGS. 5 and 6, which supports the outboard end of the launch rail after erection;

FIG. 8 is a plan view seen in the direction A—A in FIG. 7, but with some parts omitted; and FIG. 9 is a simplified cross sectional elevation of a variable-volume air reservoir vessel.

Figure 1:
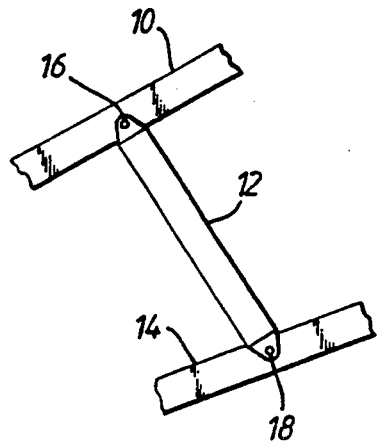
FIGS. 1 and 2 are diagrams illustrating the invention in a generalised form, in terms of a structure which is represented in a stable erected state in FIG. 1, and in an unstable, structurally deficient, state in FIG. 2.

Referring first to FIG. 1, this shows, in an idealised form, part of a structure for heavy construction purposes (as defined above), adapted to function when in the stable erected state shown in this Figure. It includes first, second and third structural elements 10, 12 and 14 respectively. The element 12 is joined to the elements 10 and 14 by joints 16 and 18 respectively. In this erected state, which may be assumed to be statically determinate or redundant, all structural loads are transferred directly between the elements via the joints 16 and 18.

The second element 12 is adapted for use as a dynamic absorber to damp forced vibrations of the first element 10 during erection of the structure, or at any other time when the element 10 is not part of a statically determinate or redundant structure. It comprises a hollow body 20 of known mass, substantially smaller than the mass of the first element 10. The hollow body 20 is vented to the atmosphere at 21 and forms the damping chamber. The second element also includes a resilient coupling 24 which is secured to a joint 22 by which the elements 10 and 12 are joined together. During erection of the structure, FIG. 2, the elements 10 and 12 constitute a deficient structure which is for example manoeuvred into position to be subsequently joined to the element 14 and any other parts of the structure, so as to complete the latter.

During this deficient or unstable stage, the element 12 is supported only from the element 10: no structural load, as such, is transferred directly between them. The stiffness of the resilient coupling 24 is very low, and is so chosen in conjunction with the mass of the body 20 that the natural frequency of vibration of the body 20 and coupling 24 together is very slightly less than the frequency of vibration of the element 10 which is to be damped (e.g. its fundamental flexural natural frequency), so that under conditions in which the latter would tend to vibrate at that frequency, the element 12 reduces or eliminates such vibrations by itself vibrating, with the body 20 moving against the resilience of the coupling 24.

Figure 2:
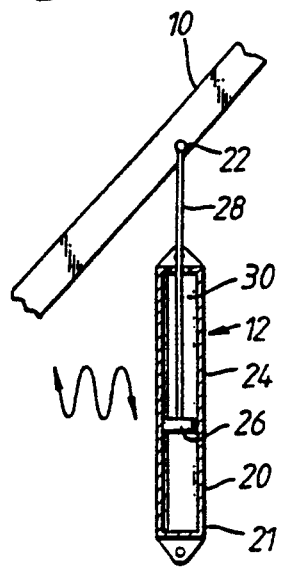

In FIG. 2 the coupling 24 is shown as a gas spring, purely for convenience. In this arrangement it comprises a working member 26, 28 in cooperation with a closed gas chamber 30. The working member comprises a piston 26 suspended by a rigid rod 28 from the joint 22, with a predetermined amount of a gas in the closed gas chamber 30, here the enclosed space above the piston.

Once the structure is fully erected (FIG. 1), the element 12 is no longer suspended, and the joint 22 is bypassed, as far as load transfer is concerned, by the joint 16 which is completed on erection.

Figure 3:
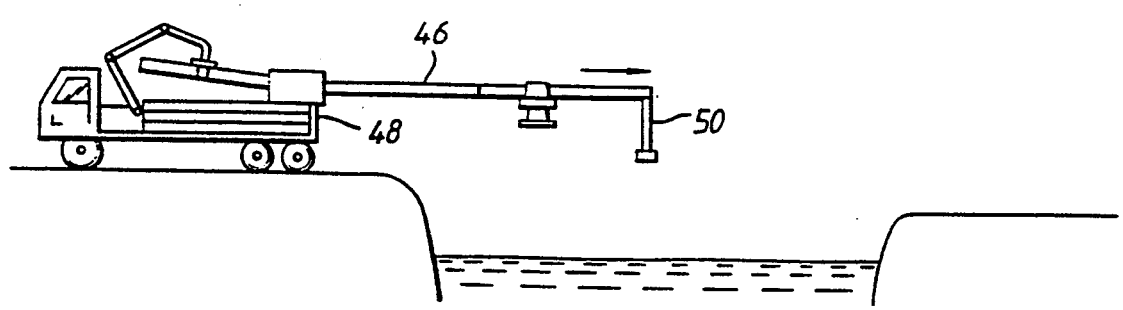
FIGS. 3 and 4 are simplified views showing some stages in the erection and use of a launch rail for use in the erection of a temporary bridge.
Figure 4:
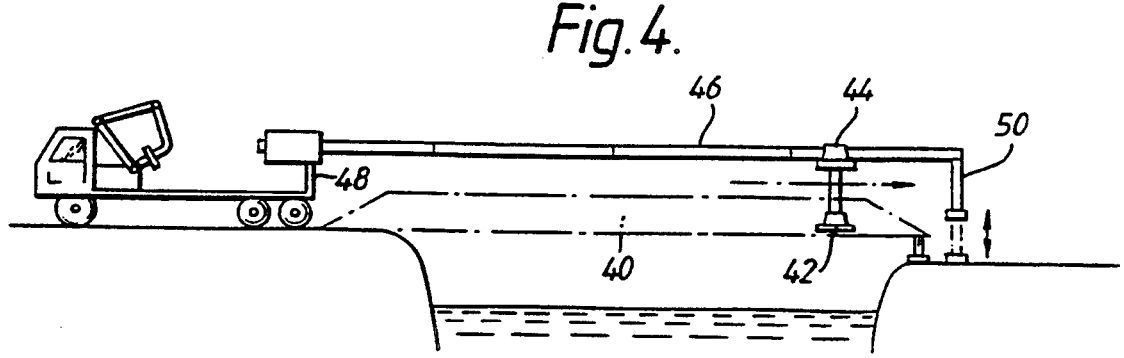

FIGS. 3 and 4 show in a greatly simplified form a system of the kind described in detail in United Kingdom Patent No. 2 196 674. A temporary bridge 40 is erected across a river by means of a sling 42, suitably engaged with the bridge components. The sling 42 is suspended from a trolley 44 which is movable, by means not shown, along a horizontal launch rail 46. The inboard end of the rail 46 is supported on a launch vehicle 48, and its outboard end by a vertical leg 50. The vehicle 48, launch rail 46 and leg 50 thus constitute, after themselves being erected, a stable portal frame which is able to support the bridge during erection of the latter.

This frame is itself erected by building up the rail 46 in sections, so as gradually to increase its length. This is indicated in FIG. 3, from which it can be seen that, during its erection, the rail 46 is cantilevered from the vehicle 48 and is unsupported at its outboard end. The leg 50 is secured to the outboard end of the rail 46 before the first section of the latter is extended out towards the river. The length of the leg 50 is made adjustable so that, as indicated in phantom lines in FIG. 4, once the rail 46 has reached a sufficient length, the leg 50 can be extended downwardly so as to stand firmly on the ground. This completes the erection of the structure, with the outboard end of the launch rail 46 then being firmly supported by the leg.

Referring now to FIGS. 5 to 8, the leg 50 is essentially in two parts, namely a rigid vertical stanchion 52 which is secured rigidly to the end of the launch rail 46, and a lower leg part 54 which is suspended (as will be explained in detail) from the stanchion 52. The stanchion 52 consists in this example of a hollow post 56 of square cross section and a hollow skirt 58, also of square cross section, secured to the bottom end of the post 56 and projecting below it. The post 56 is secured to the launch rail 46 by an anchorage 60 which can be made so that the height of the post 56 is adjustable to ensure that no part of the leg 50 touches the ground until the leg is seated on the ground at the end of the erection process as mentioned above. The lower leg part 54 has a hollow body 62, which in this example is generally of circular outside cross section. The body 62 is hollow and consists essentially of a cylinder, divided by a bulkhead 64 into an upper or gas spring cylinder 66 and a lower or jack cylinder 68. The jack cylinder 68 is part of a conventional hydraulic jack incorporated in the leg 50 and comprising a jack post 70 extending through the bottom end of the cylinder 68 to terminate in a pivot block 72, which carries a bipod foot 74. The foot 74 consists of a cross beam 76 which supports two articulated ground bearing pads 78. The upper end of the jack post 70 carries a piston head 80 which can slide in the cylinder 68 under the control of hydraulic fluid introduced above the piston head, through an oil port 82 penetrating the body 62 and connected through a supply line 86 to a conventional hydraulic jack pump 84. The pump 84 can be mounted in any convenient position—in this case on the cross beam 76. The pump 84 is not shown in FIG. 7.

A gas spring piston member 88 includes a hollow piston rod 90 and an integral gas spring piston 92, which fits coaxially in the gas spring cylinder 66 so that the latter can slide up and down with respect to the piston 92. The gas spring cylinder 66 forms the damping chamber. The piston rod 90 projects out through the top end wall 93 of the cylinder 66 to terminate in an attachment lug 94, the length of the piston rod being such that the lug 94 is always above the body 62.

The portion of the cylinder 66 which is above the piston 92. i.e. on the same side as the attachment lug 94, is in communication with a closed air reservoir 96, through conduit means which, with the air reservoir and that part of the cylinder 66, constitute a closed gas chamber.

The conduit means connecting the air reservoir 96 with the cylinder 66 can take any suitable form, and in the example shown in FIG. 7 the cylinder 66 has a liner 98 with a radial air port 100 at its upper end which communicates, through an axial groove 102 in the surrounding part of the body 62, with an external connector 104 for a pipe 106 leading to the reservoir 96. The bottom end of the gas spring cylinder 66 is vented to atmosphere through a radial vent 108. The air reservoir 96 can take any suitable form: in FIG. 7 it is an inflatable, flexible bag which is mounted (in any suitable way) on the outside of the body 62, whereas in FIG. 5 it is a single rigid cylinder firmly strapped to the outside of the body 62.

The air reservoir may also be made adjustable in volume, so as to tune the gas spring (which is explained below) to an approximation of, or to exactly, the mass of the structure in which vibrations are to be damped. In practice this means, for instance, that the dynamic absorber can be tuned to suit different lengths of launch rail.

This may be done by making the air reservoir 96 in the form of two or more air vessels, rigid like the vessel in FIG. 5 or flexible as in FIG. 7, or a combination of rigid and flexible vessels. These vessels are connected either in series with each other, with a stop valve between each vessel and the next, or in parallel, with each vessel connected to the air pipe 106 through a stop valve. An arrangement with some vessels in series and some in parallel is also possible. FIG. 6 shows an example of the former case, with two vessels 97 connected in series through an air line 126 with a stop valve 128, one of the vessels 97 being connected with the pipe 106 as before. The case in which multiple vessels are arranged in parallel is not shown; a stop valve system may be provided in this case, bringing the pipe 106 into communication with any selected number of the vessels.

Whatever form of interconnection is adopted, the conduit means that brings the air reservoir (consisting of a plurality of vessels) into communication with the gas spring cylinder 66, and which includes the pipe 106 and forms part of the gas chamber defined above, also includes the means, e.g. the air pipe 126 in FIG. 6, which connects one vessel with another and/or with the pipe 106, together with the stop valve or valves.

Opening and closing of the stop valve or valves varies the number of air vessels in use and therefore the effective volume of the air reservoir, so providing a tuning facility, which is somewhat coarse if there are only two vessels as in FIG. 6. The more vessels there are, and the smaller each one is made, the less coarse can this tuning be made.

In yet another tunable form of air reservoir, the air vessel, or one the air vessels where there is a multivessel arrangement, may be of a kind having an effective volume which can be adjusted at will to a predetermined value. One example of such vessel is shown at 130 in FIG. 9. It comprises a rigid closed shell 132, along which a piston 134 with a circumferential seal 136 is moveable by a leadscrew 138, controlled by a handwheel 140, in this example through bevel gears 142, to adjust the effective volume 144 of the vessel 130.

Where a vessel 130 is used, or any other suitable form of vessel arranged for deliberate adjustment of its effective volume, it will normally be connected directly to the air pipe 106, i.e. in a series arrangement it will be the first in the series. Fine tuning of the gas spring is thus made possible.

It will be realised that a single air vessel, or any one or more vessels in a multiple-vessel reservoir, may be subdivided within a single outer shell or skin to form any required number of separate sir spaces, which can be selectively brought into play by use of stop valves as described above, and any one of which may be adjustable in volume, e.g. in a similar manner to the vessel 130.

The bulkhead 64 carries an upstanding fixed post terminating in a dashpot piston 110, which fits coaxially inside the hollow piston rod 90. The space within the rod 90, above the piston 110, forms a dashpot chamber, totally enclosed except through a small axial hole or groove formed through the piston 110. These components generally constitute a conventional dashpot 111.

The attachment lug 94 has a through hole by which it is suspended freely on a fixed suspension bar 112 secured across the skirt 58, its axis being indicated at 114 in FIG. 8.

A trunnion 116 is incorporated in the body 62. It has an upwardly facing thrust surface 118 for endwise abutting engagement with the bottom end face of the skirt 58 when the structure has been erected. Therefore, in the example shown in FIGS. 5 to 8, the trunnion is square. It should be remembered that FIG. 7 shows the leg 50 in the state which is also shown in FIG. 5, i.e. with the ground pads 78 not resting on the ground, so that the lower leg part 54 is fully suspended from the stanchion 52 via the suspension joint comprising the bar 112 and lug 94. In this condition, the trunnion thrust face 118 is spaced below the bottom end of the skirt 58.

Guide means may optionally be provided for preventing the lower leg part 54 from swinging sideways with respect to the stanchion 52. Such guide means, if provided, may take any suitable form: in this example it consists of upstanding guide bars 120, fixed to the trunnion 116 so that they can slide easily in the skirt 58.

The closed gas chamber comprising the air reservoir 96, the gas spring cylinder 66 above the gas spring piston 92, and the associated conduit means described above, corresponds in operation to the closed gas chamber 30 in FIG. 2, to act as a gas spring. The amount of air in this chamber is chosen, in conjunction with the combined mass of those components of the lower leg part 54 which are in effect suspended from the gas spring piston member 88 by means of this gas spring, so that this combined mass and the air in the closed gas chamber together have a natural frequency of vibration which is slightly lower than that of the structural element which consists of the cantilevered launch rail 46 together with the stanchion 52. Accordingly, during erection (FIGS. 3, 5 and 7), the rail 46 with its stanchion 52 can be regarded as the "first element" in which unwanted forced vibrations are damped out by a dynamic absorber, in which the operating mass is that of the second element (i.e. the lower leg part 64) which is also an integral part of the structure when erected (FIGS. 4 and 6). The capacity of the air reservoir 96 is adjusted, where it consists of more than one vessel as discussed above, and/or includes a tunable vessel such as the vessel 130, so as to satisfy the above criterion.

The vibration of the dynamic absorber consists in axial, back and forth reciprocating motion of the gas spring cylinder 66 (with the components carried by it) with respect to the gas spring piston 92. This reciprocating motion is itself controlled by the dashpot 111. It should be noted that during erection, the jack is held fully retracted as shown in FIGS. 5 and 7. FIG. 7 also shows, in phantom lines to the right of the centre line 122, the lowest, or maximum extended, positions of certain components during vibration of the dynamic absorber.

Once the launch rail 46 has reached its fully extended state, FIG. 4, erection of the structure is completed by operating the jack to extend the jack post 70 until the ground pads 78 are firmly seated on the ground as shown in FIG. 6. The same action also forces the body 62 upwards until the trunnion thrust face 118 bears against the bottom of the stanchion skirt 58. The trunnion 116 now acts as load bearing means through which all structural loads between the launch rail 46 and the ground are now transmitted, with the suspension joint 94, 112 and the gas spring piston member 88 no longer serving any purpose. The positions of various components in the erected state are indicated in FIG. 7 in phantom lines to the left of the centre line 122, that indicated for the jack piston head 80 being of course merely by way of example.

Use of a dashpot is only one possible way of controlling the vibration of the dynamic absorber itself, and any other known method may be used. The resilient coupling, which in the above example comprises an air spring with a piston-and-cylinder type damping arrangement, may be replaced by any other form of resilient coupling having the required low stiffness so as to give the desired effect. For example the working element, which in FIG. 7 is the gas spring piston 92, may be replaced by a diaphragm or bellows defining a boundary of the damping chamber (i.e. that part of the gas spring chamber which is in the body 62), the diaphragm or bellows being of course deformable so that there is relative displacement between itself and the body.

I claim:

1. A structure for heavy construction purposes, adapted to function when in a stable erected state and including a first structural element (10) and a second structural element (12) juxtaposed to, and of substantially smaller mass than, the first element (10), wherein the first and second elements are adapted for direct transfer of structural loads between them in the erected state only, characterised in that the structure includes a joint (22) between the said elements whereby the second element (12) is supported from only the first element (10) when the structure is in a structurally deficient state, and wherein the second element (12) includes a resilient coupling (24), secured to the joint (22) and being of such stiffness that, in the deficient state, the second element (12) constitutes a dynamic absorber for damping forced vibrations of the first element (10).

2. A structure according to claim 1, characterised in that the second element (12) has load bearing means (16,18) for transferring substantially all structural loads between the two elements in the erected state, and the joint (22) comprises suspension means (28) whereby the second element (12) is fully suspended from the first element (10) in the deficient state.

3. A structure according to claim 1, characterised in that the resilient coupling (24) comprises a gas spring.

4. A structure according to claim 3, characterised in that the second element (12) comprises a body (20) formed with a damping chamber, and a working element (26,28) carried by the body (20) and connected to the said joint (22), the working element (26,28) defining a boundary of the damping chamber and being arranged for relative displacement between itself and the body (20), and wherein the second element (12) includes a closed gas chamber (30), at least part of which consists of a portion of the damping chamber, the coupling comprising the working element (26,28) and the gas chamber (30) whereby, when the latter contains an appropriate quantity of a gas, the coupling acts as a gas spring.

5. A structure according to claim 4, characterised in that the damping chamber is a gas spring cylinder (66) in the body (54), the working element being a gas spring piston member (88) having attachment means (94) for attaching the two elements together in the said joint (94,112,58), the gas spring piston member (88) including a gas spring piston (92) arranged for relative sliding between itself and the gas spring cylinder (66), the said portion of the damping chamber being the portion of the gas spring cylinder (66) on one side of the piston (92).

6. A structure according to claim 5, characterised in that the gas spring cylinder portion on the same side of the piston (92) as the attachment means (94) is that which forms part of the gas chamber.

7. A structure according to claim 4, characterised in that the gas chamber includes a gas reservoir (96) external to the damping chamber, and conduit means (102,106) for bringing the damping chamber into communication with the reservoir (96).

8. A structure according to claim 7, characterised in that the gas reservoir (96) comprises a plurality of closed vessels (97), the conduit means being connected with each vessel and including means for selectively isolating at least one of the vessels from the damping chamber whereby the number of vessels acting as the gas reservoir can be varied.

9. A structure according to claim 8, characterised in that the conduit means (106,126) connects at least two vessels (97) of the reservoir (96) in series with each other, and one vessel of the series with the damping chamber, with a said isolating means (128) between each vessel of the series and the next.

10. A structure according to claim 8, characterised in that the conduit means connects at least two vessels of the reservoir in parallel with each other, the selective isolating means being arranged to act between the damping chamber and parallel-connected vessels.

11. A structure according to claim 7, characterised in that the gas reservoir comprises at least one closed vessel (132) having adjusting means (134,138,140) for varying to a predetermined value the effective volume of the vessel.

12. A structure according to claims 7, characterised in that the reservoir (96) comprises at least one flexible, inflatable container.

13. A structure according to claims 1, characterised in that the second element includes a body (54) and a foot (74), and incorporates a jack for adjusting its length, the jack comprising a jack cylinder (68) formed in the body, a jack piston member (80) slidable in the jack cylinder and coupled to the foot (74), and pressurising means (84) for pressurising the jack cylinder (68).

14. A structure according to claim 13, characterised in that the body (62) is formed with a hollow internal cylinder divided transversely to form the jack cylinder (68) and the gas spring cylinder (66).

15. A structure according to claims 1, characterised in that the first element (10) is a beam, the second element (12) being a support for supporting at least part of the weight of the beam in the erected state.

16. A structure according to claim 15, characterised in that the beam is a launch rail (46) for spanning a gap to launch a bridge across a gap, the support being a pendant leg (50), joined to the outboard end of the launch rail (46) and including a foot (74) for supporting said outboard end on the ground in the erected state.

* * * * *